United States Patent
Jung et al.

(10) Patent No.: US 10,982,375 B2
(45) Date of Patent: Apr. 20, 2021

(54) METHOD FOR CONTROLLING WASHING MACHINE

(71) Applicant: LG Electronics Inc., Seoul (KR)

(72) Inventors: Hwanjin Jung, Seoul (KR); Myunghun Im, Seoul (KR); Jaehyun Kim, Seoul (KR); Junghoon Lee, Seoul (KR); Kyungchul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 16/240,484

(22) Filed: Jan. 4, 2019

(65) Prior Publication Data
US 2019/0211496 A1 Jul. 11, 2019

(30) Foreign Application Priority Data

Jan. 5, 2018 (KR) .................. 10-2018-0001841

(51) Int. Cl.
*D06F 39/08* (2006.01)
*D06F 33/00* (2020.01)
(Continued)

(52) U.S. Cl.
CPC ............ *D06F 39/088* (2013.01); *D06F 33/00* (2013.01); *D06F 33/34* (2020.02); *D06F 34/28* (2020.02);
(Continued)

(58) Field of Classification Search
CPC ........ D06F 33/00; D06F 34/28; D06F 37/266; D06F 39/028; D06F 39/083;
(Continued)

(56) References Cited

U.S. PATENT DOCUMENTS

2004/0139557 A1* 7/2004 Seo ................. D06F 37/203
8/159
2007/0107138 A1* 5/2007 Bernardino ........... D06F 39/083
8/158
(Continued)

FOREIGN PATENT DOCUMENTS

EP 2987902 2/2016
WO WO2011046363 4/2011

OTHER PUBLICATIONS

Extended European Search Report in European Application No. 19150328.3, dated Apr. 8, 2019, 10 pages.

*Primary Examiner* — Joseph L. Perrin
(74) *Attorney, Agent, or Firm* — Fish & Richardson P.C.

(57) ABSTRACT

A method of controlling a washing machine. The washing machine includes a tub with an entry hole configured to receive laundry, a drum rotatably disposed in the tub, a ring-shaped gasket disposed along a circumference of the entry hole of the tub, a pump configured to circulate water that is discharged from the tub, and at least one circulation nozzle provided in the gasket and configured to spray the water that is circulated by the pump into the drum. The method includes: supplying water into the tub; rotating the drum; accelerating a pump speed of the pump while the drum rotates; and based on the pump speed of the pump reaching a threshold speed during the acceleration of the pump, opening a spray valve of the washing machine such that water supplied from an external water source is sprayed into the drum through a direct water nozzle.

20 Claims, 8 Drawing Sheets

(51) Int. Cl.
  *D06F 34/28* (2020.01)
  *D06F 33/34* (2020.01)
  *D06F 37/26* (2006.01)
  *D06F 39/02* (2006.01)
  *D06F 103/18* (2020.01)
  *D06F 103/48* (2020.01)
  *D06F 105/02* (2020.01)

(52) U.S. Cl.
  CPC .......... *D06F 39/028* (2013.01); *D06F 39/083* (2013.01); *D06F 37/266* (2013.01); *D06F 2103/18* (2020.02); *D06F 2103/48* (2020.02); *D06F 2105/02* (2020.02); *D06F 2202/12* (2013.01); *D06F 2204/088* (2013.01)

(58) Field of Classification Search
  CPC ............... D06F 39/088; D06F 2202/12; D06F 2204/088; D06F 33/34; D06F 2103/18; D06F 2103/48; D06F 2105/02
  See application file for complete search history.

(56) References Cited

U.S. PATENT DOCUMENTS

| | | | | |
|---|---|---|---|---|
| 2007/0113595 | A1* | 5/2007 | Harwood | D06F 39/087 68/12.01 |
| 2012/0103026 | A1* | 5/2012 | Oyama | D06F 34/22 68/13 R |
| 2015/0354122 | A1* | 12/2015 | Kwon | D06F 29/02 8/137 |
| 2017/0096764 | A1 | 4/2017 | Kim et al. | |
| 2018/0298538 | A1* | 10/2018 | Nishiura | D06F 37/304 |

\* cited by examiner (a)

| | DETERGENT DISSOLVING | LAUNDRY SOAKING | WASHING | | | WASHING | SPIN-DRYING |
|---|---|---|---|---|---|---|---|
| DRUM DRIVING MOTION | Step / Scrub | Squeeze | | Rolling | Tumble | Tumble | |
| NUMBER OF SPRAY NOZZLES | 2 | 5 (STAR SHAPE) WATER SUPPLY | 2 | 4 | 4 | 5 (STAR SHAPE) WATER SUPPLY / 4 | |

METHOD FOR CONTROLLING WASHING MACHINE

CROSS-REFERENCE TO RELATED APPLICATION

This application claims the benefit of an earlier filing date and right of priority to Korean Patent Application No. 10-2018-0001841, filed on Jan. 5, 2018 in the Korean Intellectual Property Office, the disclosure of which is incorporated herein by reference.

TECHNICAL FIELD

The present disclosure generally relates to controlling a washing machine.

BACKGROUND

A washing machine is a general term referring to an apparatus that separates contaminants from clothing, bed sheets, and so on (hereinafter, referred to as "laundry" using chemical decomposition and friction between water and detergent The washing machine includes a tub for containing water, and a drum rotatably provided in the tub and accommodating laundry. The washing machine is configured to circulate water, discharged from the tub, using a circulation pump and spray the circulating water into the drum through a nozzle.

U.S. Pat. No. 9,534,331B2 (hereinafter, referred to as "Related Art 1") discloses a direct water nozzle and a pair of gasket nozzles, which are provided in a ring-shaped gasket installed at an entry hole of a tub. Related Art 1 suggests that was water is sprayed into the drum using the direct water nozzle or the pair of gasket nozzles when a laundry distributing step, a penetration rinsing step, or the like is performed. However, Related Art 1 does not explicitly mention how spray times of the respective nozzles are controlled. In particular, in Related Art 1, the circulation pump just pumps wash water to the pair of gasket nozzles, but does not control a flow rate of circulating water (or a rotation speed of a pump).

Japanese Patent Application Publication No. 2010-36016 (hereinafter, referred to as "Related Art 2") discloses a washing machine having a rotary drum in a water tank, and a circulation pump configured to circulate water discharged from the water tank, wherein the circulation pump is able to control a rotation speed. Related Art 2 suggests that an electronic valve of a water supply system is opened to supply source water into the water tank (tub) through a detergent accommodator and then the circulation pump is controlled to operate. However, Related Art 2 does not control operation of the electronic valve while the circulation pump operates.

It is necessary to come up with a new cycle that takes movement of laundry, pressure of circulating water sprayed through the gasket nozzle, and supply of direct water (source water) through the direct water nozzle all into account by controlling a spray time of the direct water nozzle accurately in consideration of rotation of the drum and rotation of the circulation pump.

SUMMARY

One object of the present invention is to provide a method for controlling a washing machine, the method by which a rotation speed of a pump is controlled during rotation of a drum so as to spray water in a preset pattern through a circulation nozzle in response to movement of laundry caused by the rotation of the drum, wherein a spray time of the direct water nozzle is able to be controlled accurately based on the rotation speed of the pump.

The direct water nozzle sprays source water (direct water) supplied with constant pressure and thus has a uniform spray form. On the other hand, a spray form of the circulation nozzle may vary by a rotation speed of the pump. Thus, in the case where a spray tie of the direct water nozzle is not controlled accurately, if water is sprayed through both the circulation nozzle and the direct water nozzle at the same time, the spray form cannot be controlled constantly. One object of the present invention is to provide a method for controlling a washing machine, the method by which a spray form is accurately controlled according to a setting when water is sprayed through both the direct water nozzle and the circulation nozzle at the same time by controlling a spray time of the direct water nozzle.

The present invention provides a method for controlling a washing machine having a drum rotatably provided in a tub, a pump for pumping water discharged from the tub to at least one circulation nozzle for spraying the water into the drum, and a direct water nozzle for spraying direct water supplied from an external water source into the drum.

The method comprises a step of supplying water into the tub, a step of rotating the drum, a step of accelerating rotation of the pump during the rotation of the drum, and a step of spraying direct water (water supplied from an external water source) into the drum through the direct water nozzle during operation of the pump.

Before the step of supplying the water, a step of supplying water into the tub through a dispenser with detergent contained therein and rotating the pump at a constant speed may be further performed.

Spraying water through the direct water nozzle is controlled based on a rotation speed of the pump. Specifically, a spray valve for regulating direct water supplied to the direct water nozzle is opened based on the rotation speed of the pump. If the rotation speed of the pump reaches a preset value, the spray valve is opened such that water is sprayed through both the circulation nozzle and the direct water nozzle at the same time.

A step of draining water from the tub during the operation of the pump may be performed. Even in the middle of the draining step, the spray valve may be opened so as to keep water from being sprayed through the circulation nozzle.

A step of stopping the pump may be further performed. Spraying water through the direct water nozzle may be terminated by closing the spray valve in response to the stopping of the pump.

The stopping of the pump may be performed in response to stopping of the rotation of the drum. The stopping of the pump and the closing of the spray valve may be performed sequentially in response to a stop signal corresponding to the stopping of the rotation of the drum.

The rotating of the drum may include a step of accelerating the rotation of the drum, and a step of decelerating the rotation of the drum.

The acceleration of the pump may be performed in response to the acceleration of the rotation of the drum. A step of decelerating the rotation of the pump may be further performed in response to the deceleration of the rotation of the drum.

The acceleration and the deceleration of the rotation of the drum may be controlled to be repeated, the pump may be accelerated in response to the acceleration of the rotation of the drum, and the pump may be decelerated in response to the deceleration of the rotation of the drum.

In the step of rotating the drum, the rotation of the drum may be controlled by a processor based on information on a preset drum motion. The acceleration of the rotation of the pump may be performed based on the information on the preset drum motion. The deceleration of the rotation of the pump may be performed when a rotation angle of the drum reaches a motion angle set for the drum motion.

The deceleration of the rotation of the pump is performed when a rotation angle of the drum reaches a motion angle set for the drum motion and a rotation speed of the pump reaches a rotation speed upper limit value set for the drum motion. A step of accelerating the pump may be further performed when the pump is decelerated and the rotation speed of the pump reaches a rotation speed lower limit value set for the drum motion.

A step of sensing a laundry may be further performed. The upper limit value and the lower limit value may be set according to the laundry load, and accelerating the pump to the upper limit value and decelerating the pump to the lower limit value may be repeated.

The circulation nozzle may be provided as a plurality of circulation nozzles. The direct water nozzle may be disposed higher than the plurality of circulation nozzles. The direct water nozzle may be disposed in the gasket.

The plurality of circulation nozzles may be arranged such that two or more circulation nozzles are provided on both a left side and a right side of the gasket with reference to the direct water nozzle. A pair of circulation nozzles arranged on the left side of the gasket and a pair of circulation nozzles arranged on the right side of the gasket may be symmetric to each other.

The pair of circulation nozzle provided on the left side of the gasket may be arranged at different heights, and the pair of circulation nozzles provided on the right side of the gasket may be disposed at different heights.

A lower circulation nozzle in the pair of circulation nozzles provided on the left side of the gasket may be directed in an upward-right direction, and a higher circulation nozzle thereof may be directed in a downward-right direction. A lower circulation nozzle in the pair of circulation nozzles provided on the right side of the gasket may be directed in the upward-left direction, and a higher circulation nozzle thereof may be directed in a downward-left direction.

The method may further include a step of decelerating the pump after acceleration of the pump, and the acceleration and deceleration of the pump may be repeated such that water streams sprayed through the pair of circulation nozzles provided on the left side of the gasket and water streams sprayed through the pair of circulation nozzles provided on the right side reciprocate back and forth within the drum. When water streams are simultaneously sprayed through the circulation nozzles and the direct water nozzle, the water streams may be sprayed in a star shape.

In another general aspect, the present invention provides washing machine including: a tub with an entry hole formed therein; a drum rotating in the tub; a driver configured to rotate the drum; a pump configured to circulate water discharged from the tub; a gasket installed at a circumference of the entry hole and comprising at least one circulation nozzle for spraying the water circulated by the pump into the drum; a water supply valve for regulating the water supplied into the tub; a direct water nozzle for spraying source water into the tub; a spray valve for regulating the source water supplied to the direct water nozzle; and a processor configured to open the water supply valve to supply water into the tub, control the driver to rotate the drum when a predetermined amount of water is supplied into the tub, accelerate rotation of the pump while the drum rotates, and open the spray valve when a rotation speed of the pump reaches a preset value during the acceleration of the pump.

The circulation nozzle may be provided in four as two pairs of circulation nozzles respectively provided on a left side and a right side of the gasket, the direct water nozzle is provided as a single direct water nozzle between the two pairs of circulation nozzles, and water simultaneously sprayed through the five nozzles may form a star shape.

The method of the present invention controls a spray time of the direct water nozzle based on a rotation speed of the pump. A form of a water stream sprayed through the circulation nozzles is preset for a rotation speed of the pump, and the direct water nozzle has a uniform spray form. Thus, if water is sprayed through the direct water nozzle at a particular time (especially a time when a rotation speed of the circulation pump reaches a preset value) while the circulation pump is accelerated, an overall spray form at the particular time may be realized exactly as the same as anticipated.

For example, suppose that the rotation speed of the circulation pump is controlled to be accelerated and decelerated repeatedly between a preset upper limit value and a preset lower limit value and that, at a time when the rotation speed of the circulation pump reaches the upper limit value, a spray valve is opened so as to spray water through the direct water nozzle. In this case, a spray form (a range for a sprayed water stream to reach within the drum, and a direction in which the water stream is sprayed) of the circulation nozzle at a time when the circulation pump rotates at the upper limit value may be anticipated in advance through experiments and a spray form of the direct water nozzle is constant and uniform as long as there is no change in an external water source. Therefore, an overall spray form (that is, a form in which water is sprayed through both the direct water nozzle and the circulation nozzle) at a time when the rotation speed of the circulation pump reaches the upper limit value may be realized exactly.

The method for controlling a washing machine according to the present invention enables spraying water through four circulation nozzles connected to the pump motor and spraying water through one direct water nozzle connected to the spray valve at the same time, thereby enabling spraying water simultaneously through the five nozzles (5-way spray). Accordingly, the laundry soaking step and the rinsing step may be performed more conveniently, and this helps a user to determine the laundry soaking step and the rinsing step more visually.

In addition, the method for controlling a washing motor according to the present invention enables simultaneous spray control, thereby enabling a more sophisticated algorithm control when performing a spray motion using the water supply valve and the pump motor.

BRIEF DESCRIPTION OF THE DRAWINGS

The embodiments will be described in detail with reference to the following drawings in which like reference numerals refer to like elements wherein:

FIG. 6 is a diagram illustrating drum driving motions and the number of sprays for each drum driving motion;

DETAILED DESCRIPTION

Figure 1:
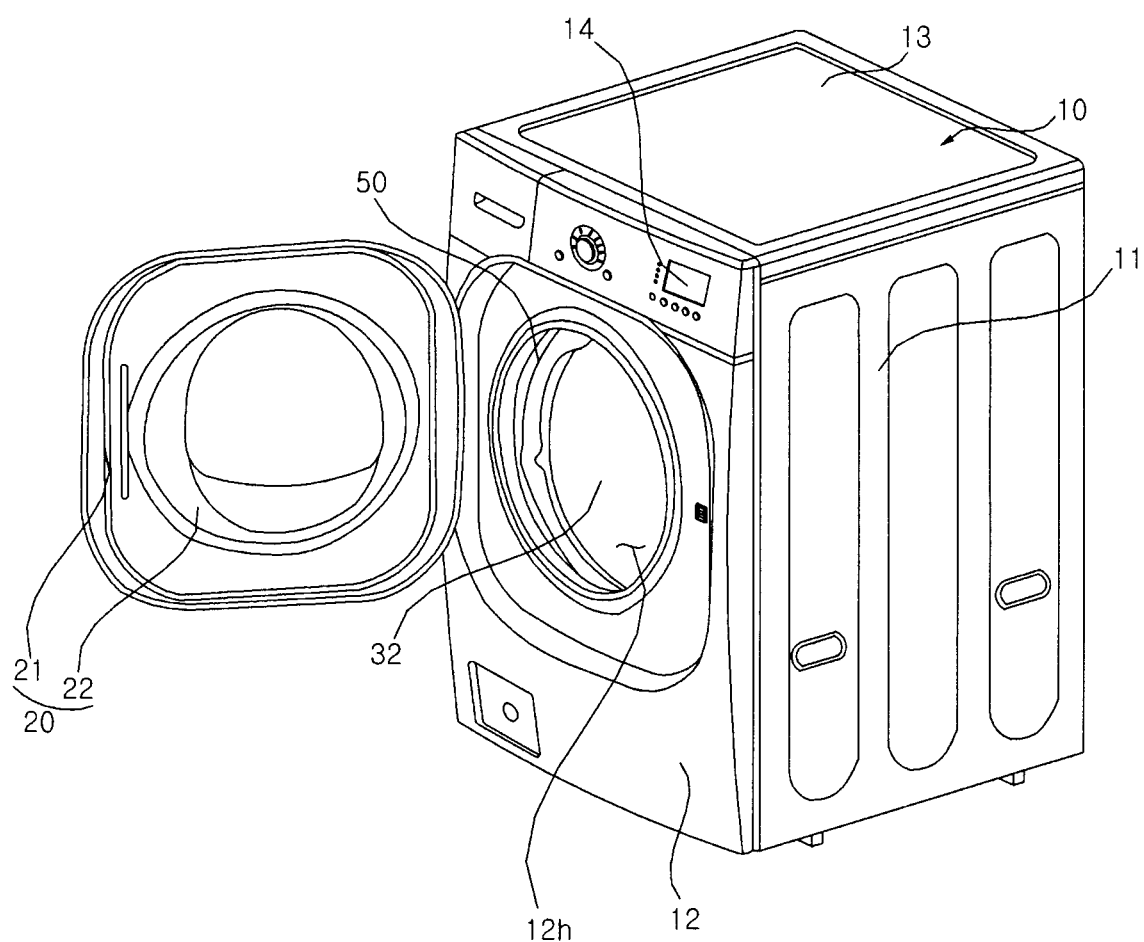
FIG. 1 is a perspective view of a washing machine to which an embodiment of the present invention is applied.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 2:
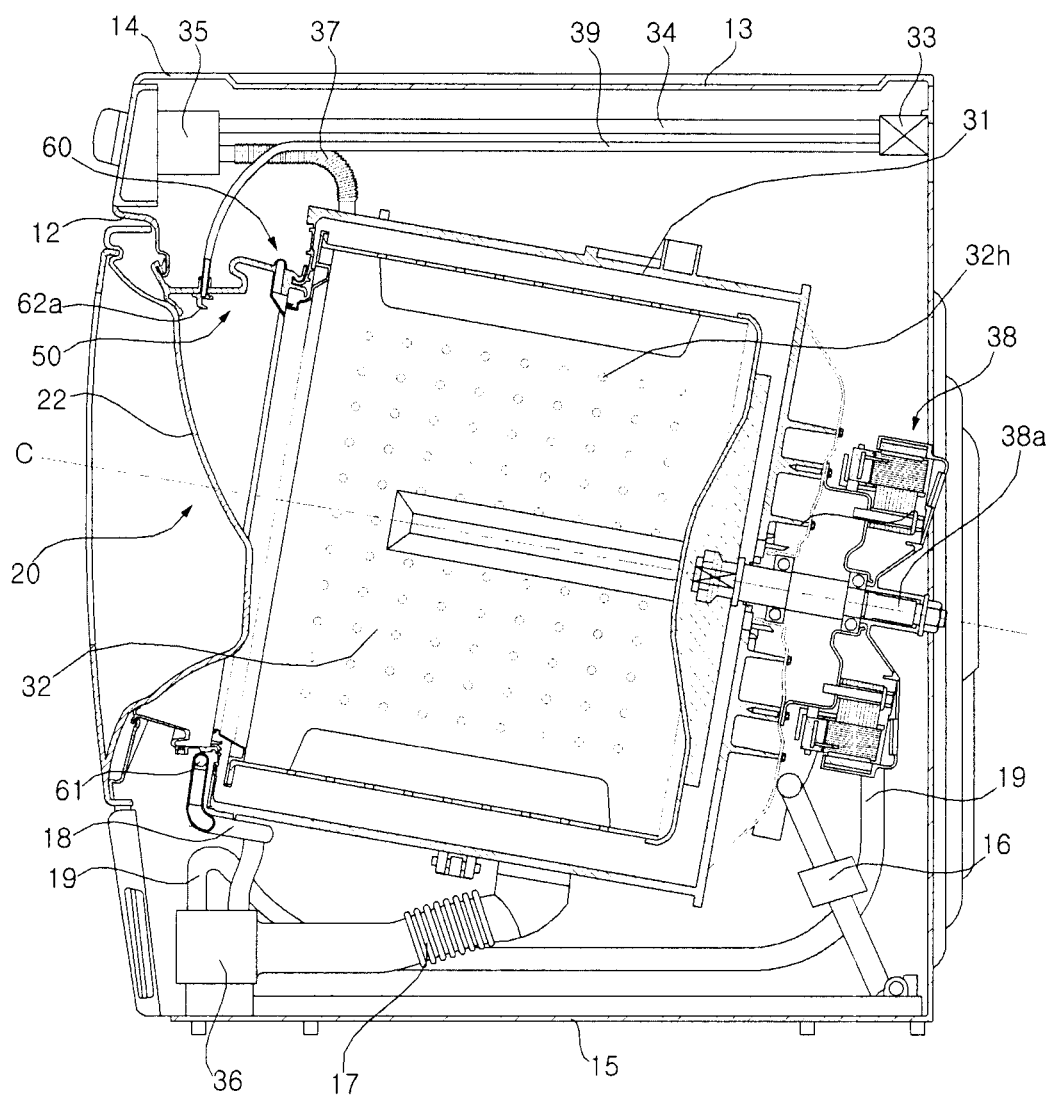
FIG. 2 is a cross-sectional view of the washing machine shown in FIG. 1.
Figure 3:
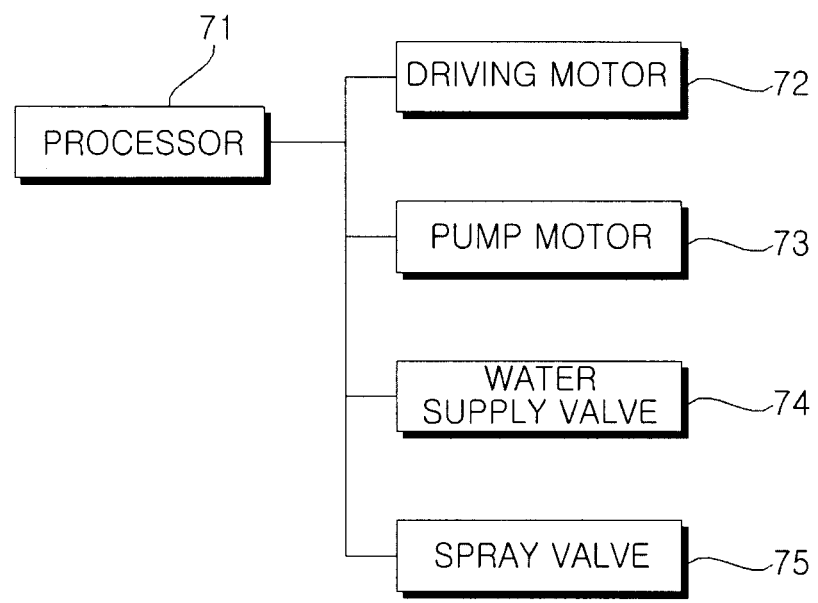
FIG. 3 is a block diagram illustrating a control relationship of major components of a washing machine according to an embodiment of the present invention.
Figure 4:
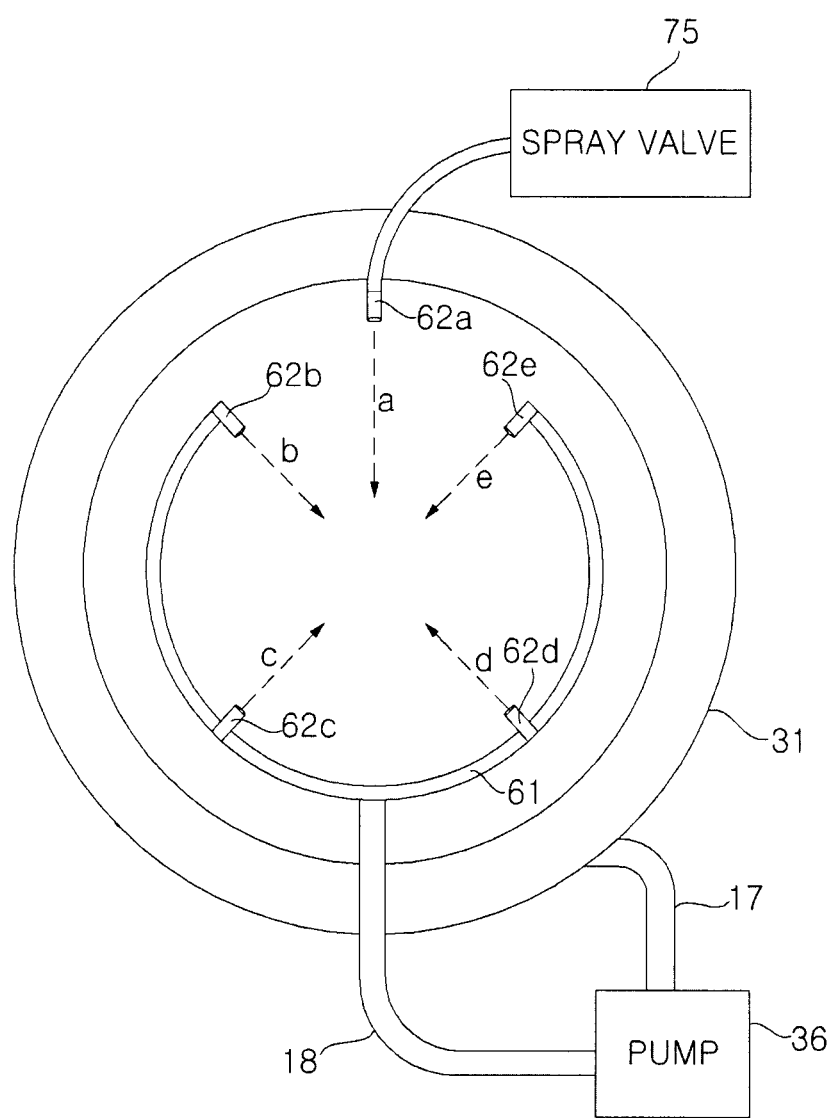
FIG. 4 is a diagram schematically illustrating a washing machine according to an embodiment of the present invention.

FIG. 1 is a perspective view of a washing machine to which an embodiment of the present invention is applied. FIG. 2 is a cross-sectional view of the washing machine shown in FIG. 1. FIG. 3 is a block diagram illustrating a control relationship of major components of a washing machine according to an embodiment of the present invention. FIG. 4 is a diagram schematically illustrating a washing machine according to an embodiment of the present invention.

Hereinafter, a washing machine to which a control method according to an embodiment is applied will be described with reference to the accompanying drawings.

Referring to FIGS. 1 to 4, a washing machine to which a control method according to an embodiment of the present invention is applied includes a casing 10. An entry hole 12h through which laundry is loaded is formed on a front surface of the casing 10. The casing 10 includes: a cabinet 11 having an open front surface, a left surface, a right surface, and a rear surface; and a front panel 12 coupled to the open front surface of the cabinet 11 and having the entry hole 12h formed therein. A bottom surface and a top surface of the cabinet 11 are open, and a horizontal base 15 supporting the washing machine may be coupled to the bottom surface. In addition, the casing 10 may further include: a top surface 13 covering the open top surface of the cabinet 11; and a control panel 14 arranged in an upper side of the front panel 12.

A tub 31 for containing water may be arranged in the casing 10. The tub 31 may have an entrance formed in a front surface of the tub 31 to receive laundry, and the entrance may communicate by a gasket 50 with the entry hole 12h formed in the casing 10.

In addition, a door 20 for opening and closing the entry hole 12h may be rotatably coupled to the casing 10. The door 20 may include: a door frame 21 having an open approximate central portion and rotatably coupled to the front panel 12; and a transparent window 22 installed to the open central portion of the door frame 21.

The gasket 50 is used to prevent a leakage of water contained in the tub 31. A front end of the gasket 50 is coupled to the front surface of the casing 10 (or the front panel 12), and a rear end of the gasket 50 is coupled to the circumference of the entrance of the tub 31. The front end and the rear end of the gasket 50 extend in a pipe shape. The gasket 50 may be formed of a flexible or elastic material. The gasket 50 may be formed of natural rubber or synthetic resin.

Hereinafter, a portion defining the inside of the pipe shape of the gasket 50 is referred to as an inner circumferential portion (or an inner circumferential surface) of the gasket 50, and an opposite portion is referred to as an outer circumferential portion (or an outer circumferential surface) of the gasket 50.

A drum 32 for accommodating laundry may be rotatably provided in the tub 31. The drum 32 accommodates the laundry and is arranged such that the entrance, through which the laundry is loaded, is placed on the front surface. The drum 32 rotates about a rotational center line C which is approximately horizontal. In this case, "horizontal" does not refer to the mathematical definition thereof. That is, even in the case where the rotation central line C is inclined at a predetermined angle (for example, an angle of 5 degrees or less) relative to a horizontal state, the rotation central line C may be considered approximately horizontal if the rotation central line C is more like in the horizontal state than in a vertical state. In order to allow water contained in the tub 31 to flow into the drum 32, the drum 32 may have a plurality of through holes 32h formed therein.

A driver 38 for rotating the drum 32 may be further provided, and a driving shaft 38a configured to rotate by the driver 38 may penetrate a rear surface of the tub 31, thereby being coupled to the drum 32.

Preferably, the driver 38 includes a direct drive motor, and the motor may include a stator fixed at the rear of the tub 31 and a rotor rotating by a magnetic force occurring between the stator and the rotor. The driving shaft 38a may rotate integrally with the rotor.

The tub 31 may be supported by a damper 16 installed onto the base 15. Vibration of the tub 31 occurring upon rotation of the drum 32 is attenuated by the damper 16. Although not illustrated in the drawings, a hanger (e.g., a spring) by which the tub 31 is hung on the casing 10 may be further provided according to an embodiment.

In addition, at least one water supply hose for guiding water supplied from an external water source such as a water tap to the tub 31, a water supply valve 74 for regulating the at least one water supply hose, and a spray valve 75 may be further provided.

In addition, a dispenser 35 for supplying additives, such as detergent and textile softener, into the tub 31 or the drum 32 may be provided. The additives may be accommodated in the dispenser 35 separately by types thereof. The dispenser 35 may include a detergent accommodator for accommodating detergent, and a softener accommodator for accommodating textile softener.

There may be provided at least one water supply pipe 34 for selectively guiding water, supplied through the water supply valve 74, to the accommodators of the dispenser 35. The at least one water supply pipe 34 may include a first water supply pipe for supplying water to the detergent accommodator, and a second water supply pipe for supplying water to the softener accommodator. In this case, the water supply valve 74 may include a first water supply valve for regulating the first water supply pipe, and a second water supply valve for regulating the second water supply pipe.

Meanwhile, the gasket 50 may be provided with a direct water nozzle 62a for spraying water into the drum 32 and a direct water supply pipe 39 for guiding water, supplied through the spray valve 75, toward the direct water nozzle 62a.

Water discharged from the dispenser 35 is supplied to the tub 31 through a water supply bellows 37. A water supply hole connected to the water supply bellows 37 may be formed in the tub 31.

A drain hole for discharging water may be formed in the tub 31, and a drain bellows 17 may be connected to the drain hole. There may be provided a pump 36 for pumping water discharged from the tub 31 through the drain bellows 17.

The pump 36 may selectively perform a function of pumping water, discharged from the tub 31 through the drain bellows 17, to a drain pipe 19 and a function of pumping water, discharged from the tub 31 through the drain bellows 17, to a circulation pipe 18 which will be described later. Hereinafter, water pumped by the pump 36 to be guided along the circulation pipe 18 will be referred to as circulating water.

The pump 36 may include an impeller for pumping water, a pump housing for housing the impeller, and a pump motor 73 for rotating the impeller. The following may be formed in the pump housing: an inlet port for allowing water to be introduced through the drain bellows 17; a drain outlet port for discharging water, pumped by the impeller, to the drain pipe 19; and a circulating water outlet port for discharging water, pumped by the impeller, to the circulation pipe 18.

The pump motor 73 may be capable of rotating forward and backward. Water may be discharged through the drain outlet port or through the circulating water outlet port depending on a direction of rotation of the impeller. This configuration can be achieved by appropriate designing the pump housing, and a technology relevant thereto is already published in Korean Patent Application Publication No. 10-2013-0109354 and a detailed description thereof is herein omitted.

An entry end of the circulation pipe 18 is connected to the circulating water outlet port, and an exit end of the circulation pipe 18 is connected to a nozzle water supply pipe 70. However, aspects of the present invention are not limited thereto, and a circulation pump for pumping water discharged from the tub 31 toward the circulation pipe 18 and a drain pump for pumping water discharged from the tub 31 toward the drain pipe 19 may be provided separately. According to a preset algorithm under control of at least one processor, such as processor 71, which will be described later, the circulation pump may operate (for example, to wash laundry) and the drain pump may operate (for example, to drain water).

Meanwhile, a flow rate (or a discharge pressure) of the pump 36 may be varied. To this end, the pump motor 73 included in the pump 36 may be a variable speed motor of which a rotation speed is adjustable. The pump motor 73 may be a Brushless Direct current Motor (BLDC) motor but not limited thereto. A driver for controlling a speed of the motor may be further provided, and the driver may be an inverter driver. The inverter driver converts alternating current (AC) power into direct current (DC) power, and applies the DC power to the motor at a target frequency.

At least one processor, such as processor 71, for controlling the pump motor 73 may be further provided. The processor 71 may include a Proportional-Integral (PI) controller, a Proportional-Integral-Derivative (PID) controller, and the like. The controller may receive an output value (e.g., an output current) of the pump motor 73, and control an output value of the driver based on the received output value of the pump motor 73 such that the number of rotations of the pump motor 73 follows a preset target number of rotations.

Meanwhile, the processor 71 is capable of controlling not just the pump motor 73 but also a driving motor 72 for rotating the drum 32 of the washing machine, the water valve 74 determining whether to supply water into the tub 31, the spray valve 75, and the like, thereby controlling overall operations of the washing machine. It should be understand that control of each unit mentioned in the following is performed under control of the processor 71.

According to an embodiment, there may be provided a plurality of circulation nozzles 62b, 62c, 62d, and 62e for spraying circulating water, pumped by the pump 36, into the drum 32. The direct water nozzle 62a may be disposed higher than the plurality of circulation nozzle 62b, 62c, 62d, and 62e. In addition, two or more of the plurality of circulation nozzles 62b, 62c, 62d, and 62e may be provided on both the left side and the right side of the gasket 50 with reference to the direct water nozzle 62a. In an embodiment, when viewed from a front side of the gasket 50, a pair of circulation nozzles 62b and 62c is arranged on the left side of the gasket 50, and a pair of circulation nozzles 62e and 62d is arranged on the right side of the gasket 50. The circulation nozzles 62b and 62c on the left side of the gasket 50, and the circulation nozzle 62e and 62d on the right side of the gasket 50 may be arranged symmetrically to each other.

In addition, the pair of the circulation nozzles 62d and 62c on the left side of the gasket 50 may be disposed at different heights. The pair of the circulation nozzles 62e and 62d on the right side of the gasket 50 may be disposed at different heights. A lower circulation nozzle 62c in the pair of circulation nozzles 62d and 62c on the left side of the gasket 50 may have an upward-right spray direction, and a higher circulation nozzle 62b in the pair may have a downward-right spray direction. A lower circulation nozzle 62d in the pair of the circulation nozzles 62e and 62d on the right side of the gasket 50 may have an upward-left spray direction, and a higher circulation nozzle 62e in the pair may have a downward-left spray direction.

The four respective nozzles are provided in a ring-shaped transfer pipe 61. The circulation pipe 18 for supplying pumped circulating water to the transfer pipe 61 may be connected to the center of the lower side of the ring-shaped transfer pipe 61, and the four nozzles may be provided in two pairs on the left side and the right side of the transfer pipe 61 with reference to a wash water entry hole at which the circulation pipe 18 and the transfer pipe 61 are connected.

A direct water nozzle 62a is connected to the spray valve 75. Accordingly, the four circulation nozzles 62b, 62c, 62d, and 62e may be connected to the pump motor 73 to supply circulating water pumped by the pump 36 to the tub 31, and the direct water nozzle 62a may provide water, supplied from an external water source, to the tub 31 upon operation of the spray valve 75. Only the circulation nozzles 62b, 62c, 62d, and 62e may spray water (4-way spray), and the direct water nozzle 62a may spray water together with the circulation nozzles 62b, 62c, 62d, and 62e (5-way spray). The direct water nozzle 62a may be disposed higher than the plurality of the circulation nozzles 62b, 62c, 62d, and 62e.

In an embodiment of the present invention, there are the circulation nozzles 62b, 62c, 62d, and 62e in two pairs respectively provided on the left side and the right side of the gasket 50, but aspects of the present invention are not limited thereto. That is, the number and positions of the nozzles may vary, and, in any case, it is preferable to include one or more nozzles that spray water further upward as pressure of water supplied increases (that is, as a discharge pressure, a flow rate, a rotation speed, or the number of rotations of the pump 36 increases).

Figure 5:
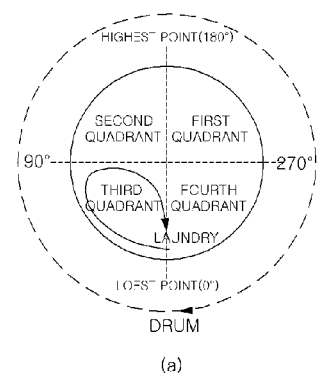
FIG. 5 is a diagram illustrating drum driving motions implementable by a washing machine according an embodiment of the present invention.
Figure 5:
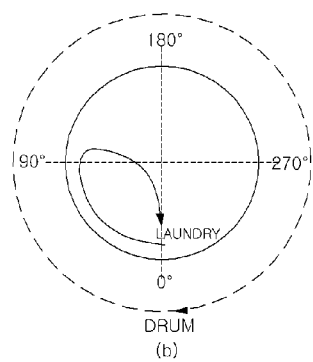
Figure 5:
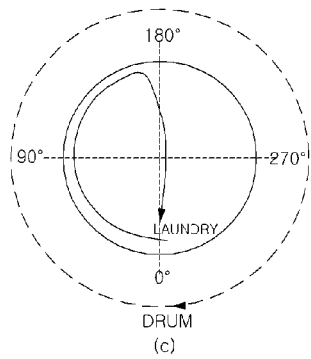
Figure 5:
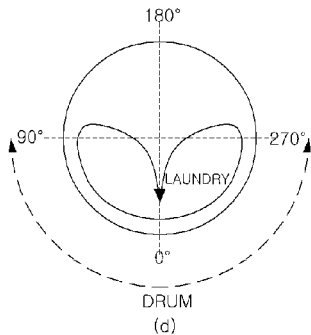
Figure 5:
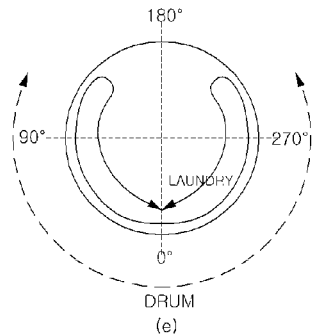
Figure 5:
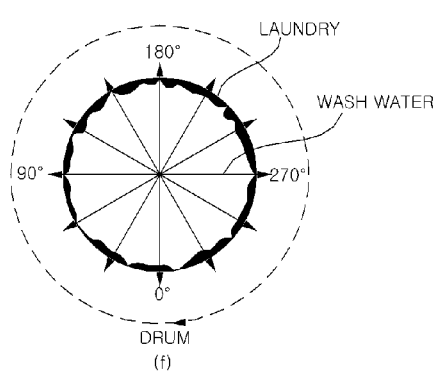
Figure 5:
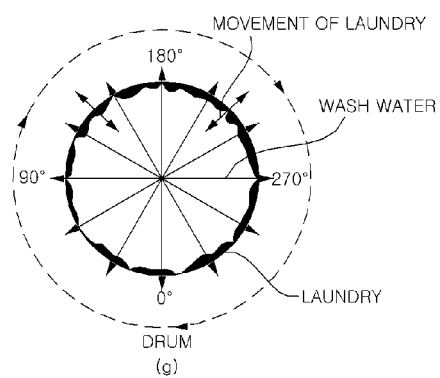

FIG. 5 is a diagram illustrating drum driving motions implementable by a washing machine according an embodiment of the present invention. FIG. 6 is a diagram illustrating drum driving motions and the number of sprays for each drum driving motion.

Hereinafter, drum driving motions and a step of supplying water through the spray valve 75 will be described with reference to FIGS. 1, 2, 3, 5, and 6.

A drum driving motion refers to a combination of a rotation direction and a rotation speed of the drum 32, and a falling direction or a falling time of laundry positioned inside the drum changes by a corresponding drum driving motion, and, as a result, the laundry moves differently in the drum 32. Drum driving motions are implemented as the driving motor 72 is controlled by the processor 71.

When the drum 32 rotates, the laundry is lifted by a lifter provided on the inner circumferential surface of the drum 32. Accordingly, a rotation speed and a rotation direction of the drum 32 may be controlled, varying impact to be applied on the laundry. That is, a mechanic force, such as friction between laundry items, friction between laundry and wash water, and a falling impact of laundry, may be varied. In other words, in order to wash laundry, a degree of pounding and rubbing the laundry or a degree of distributing the laundry or making the laundry upside down may be varied.

Meanwhile, in order to perform various drum driving motions, the driving motor 72 is preferably a direct drive motor. That is, the driving motor 72 is preferably formed in a structure in which a stator of the driving motor is fixed to the rear of the tub 31 and the driving shaft 38a rotating along with the rotor of the motor directly drives the drum 32. It is because, if a rotation direction and a torque of the motor is controlled, a delay time or a backlash may be prevented as much as possible, thereby enabled to control a drum driving motion instantly.

Meanwhile, in a structure in which a torque of the motor is transferred to a rotation shaft using a pulley, a drum driving motion allowing a time delay or a backlash, for example, a tumbling driving motion or a spin driving motion, may be implementable, but this structure is not appropriate to implement any other various drum driving motions. How the driving motor 72 and the drum 32 are drive is obvious to those skilled in the art, and thus, a detailed description thereof is herein omitted.

In FIG. 5, (a) is a diagram illustrating a rolling motion. The rolling motion is a motion in which the driving motor 72 rotates the drum 32 in one direction (preferably, one or more rotations) to control laundry on the inner circumferential surface of the drum 32 such that the laundry falls from a point at an angle of about less than 90 degrees in a rotation direction of the drum 32 toward a lowest point in the drum 32.

Upon implementation of this rolling motion, laundry at the lowest point of the drum 32 is lifted by a predetermined height in the rotation direction of the drum 32, and moves toward the lowest point in the drum 32 from the point at the angle of about less than 90 degrees in the rotation direction as if the laundry rolls. The rolling motion appears such that, when the drum 32 rotates in the clockwise direction, the laundry keeps rolling in a third quadrant of the drum 32.

In FIG. 5, (b) is a diagram illustrating a tumbling motion. The tumbling motion is a motion in which the driving motor 72 rotates the drum 32 in one direction (preferably, one or more rotations) to control laundry on the inner circumferential surface of the drum 32 such that the laundry falls toward the lowest point in the drum 32 from a point at an angle of about 90 degrees to 110 degrees in the rotation direction of the drum 32. The tumbling motion produces a mechanical force simply by controlling the drum 32 to rotate at an appropriate rotation speed in one direction, and thus, the tumbling motion is a drum driving motion that is commonly used in washing and rinsing processes.

The rotation speed of the drum 32 in the tumbling motion may be determined within a range in which a centrifugal force greater than that of the rolling motion but less than gravity is produced.

The tumbling motion appears such that, when the drum 32 rotates in the clockwise direction, laundry is lifted to a point at an angle of about 90 degrees from the lowest point in the drum 32 or to a second quadrant of the drum 32 and then falls toward the lowest point as separating away from the inner circumferential surface of the drum 32.

In FIG. 5, (c) is a diagram illustrating a step motion. The step motion is a motion in which the driving motor 72 rotates the drum 32 in one direction (preferably, less than one complete rotation) such that laundry on the inner circumferential surface of the drum 32 falls to the lowest point in the drum 32 from a vicinity of the highest point in the drum 32.

That is, the step motion is a motion of rotating the drum 32 at a speed, at which laundry does not fall from the inner circumferential surface of the drum 32 due to a centrifugal force (that is, a speed at which the laundry rotates along with the drum 32 while stuck to the inner circumferential surface of the drum 32 due to the centrifugal force), and then braking the drum 32, thereby maximizing impact to be applied to the laundry.

In FIG. 5, (d) is a diagram illustrating a swing motion. The swing motion is a motion in which the driving motor 72 rotates the drum 32 in two directions such that laundry falls from a point at an angle of about 90 degrees in a rotation direction of the drum 32. For example, if the driving motor 72 rotates the drum in the counterclockwise direction, laundry located at the lowest point in the drum 32 is lifted by a predetermined height in the counter-clockwise direction. In this case, the driving motor 72 stops rotation of the drum 32 before the laundry reaches a point at an angle of about 90 degrees in the counterclockwise direction, and accordingly, the laundry falls toward the lowest point in the drum from the point at an angle of about 90 degrees in the counter-clockwise direction.

After the rotation of the drum 32 stops, the driving motor 72 rotates the drum 32 in the clockwise direction such that the laundry is lifted by a predetermined height in a rotation direction of the drum 32 (that is, the clockwise direction). Then, the driving motor 72 is controlled such that the rotation of the drum 32 stops before the laundry reaching a point at an angle of about 90 degrees in the clockwise direction, and accordingly, the laundry falls toward a lowest point in the drum 32 from the point at an angle of about 90 degrees in the clockwise direction.

In FIG. 5, (e) is a diagram illustrating a scrub motion. The scrub motion is a motion in which the driving motor 72 rotates the drum 32 in two directions, alternately, such that laundry falls from a point at an angle of about 90 degrees or more in a rotation direction of the drum 32.

For example, if the driving motor 72 rotates the drum 32 in a forward direction, laundry located at a lowest point in the drum 32 is lifted by a predetermined height in a forward direction. In this case, if the laundry reaches a point corresponding to a set angle of about 90 degrees or more in the forward direction, the driving motor 72 provides a reverse torque to the drum 32 to temporarily stop the rotation of the drum 32. Then, the laundry on the inner circumferential surface of the drum 32 falls abruptly.

Then, the driving motor 72 rotates the drum 32 in a backward direction such that the fallen laundry is lifted to a predetermined height at 90 degrees or more in the backward direction. When the laundry reaches to a point corresponding to the set angle of 90 degrees or more in the backward direction, the driving motor 72 provides a reverse torque to the drum 32 again to temporarily stop the rotation of the drum 32. In this case, the laundry on the inner circumferential surface of the drum 32 falls toward a lowest point in the drum 32 from the point at an angle of 90 degrees or more in the backward direction.

In FIG. 5, (f) is a diagram illustrating a filtration motion. The filtration motion is a motion in which the driving motor 72 rotates the drum 32 such that laundry does not fall from the inner circumferential surface of the drum 32 due to a centrifugal force, and wash water is sprayed into the drum 32 through the circulation nozzles 62b, 62c, 62d, and 62e in this course.

Since the wash water is sprayed into the drum 32 while the laundry is spread and rotates with being stuck to the inner circumferential surface of the drum 32, the sprayed wash water penetrates the laundry due to the centrifugal force and is then discharged to the tub 31 through the through holes 32h of the drum 32.

The filtration motion makes the surface of the laundry wider and the wash water penetrates the laundry, and therefore, the laundry may be soaked uniformly.

In FIG. 5, (g) is a diagram illustrating a squeeze motion. The squeeze motion is a motion in which the driving motor 72 repeats an operation of rotating the drum 32 to keep laundry stuck to the inner circumferential surface of the drum 32 due to a centrifugal force and reducing a rotation speed of the drum 32 to separate the laundry from the inner circumferential surface of the drum 32, while wash water is sprayed into the drum 32 through the circulation nozzles 62b, 62c, 62d, and 62e during the rotation of the drum 32.

The filtration motion is different from the squeeze motion in that the filtration motion allows the drum 32 to rotate at a speed at which laundry does not fall from the inner circumferential surface of the drum 32, while the squeeze motion changes a rotation speed of the drum 32 so as to repeatedly perform a process of making the laundry stuck to and then separated from the inner circumferential surface of the drum 32.

Hereinafter, a washing cycle to which the above various motions are applied will be described briefly, and a washing course in which water is sprayed from both circulation nozzles and a direct water nozzle will be determined.

A washing cycle may be divided into a detergent dissolving step, a laundry soaking step, a washing step, a rinsing step, and a spin-drying step. In the detergent dissolving step, 3 or 4 liter of water (corresponds to a degree of filling the drum slightly) is received initially and detergent existing between the tub 31 and the drum 32 is dissolved using a step motion and a scrub motion.

In the detergent dissolving step, water is supplied into the tub 31 through the dispenser 35 with detergent contained therein. In this case, the pump 36 rotates at a constant speed. The laundry soaking step may be proceeded with by performing the filtration motion and the tumbling motion alternately or by performing the squeeze motion. In this case, the spray motion may be implemented as a butterfly motion to perform the laundry soaking step.

The butterfly motion is a motion implemented as follows: when water is sprayed from four directions through four circulation nozzles 62b, 62c, 62d, and 62e in the left and right pairs, water streams reciprocate back and forth repeatedly according to a rotation speed of the pump 36 to be sprayed in a butterfly form.

Consequently, in the laundry soaking step, while a process of making laundry stuck to and separated from the inner circumferential surface of the drum 32 is repeatedly performed by the squeeze motion, wash water adequate for a laundry load, laundry movement, power consumption, and washing performance may be supplied through the butterfly motion. In addition, using the squeeze motion and the butterfly motion, it is possible to efficiently perform laundry soaking and reduce time required for the laundry soaking.

In this laundry soaking step, in order to soak laundry quickly and efficiently, water may be sprayed in a 5-way star shape not just using a spray motion with the four circulation nozzles 62b, 62c, 62d, and 62e, but also using direct spray with the direct water nozzle 62a.

In the washing step, the drum 32 may be driven with the rolling motion and the tumbling motion to perform a spray motion according to the rolling motion and the tumbling motion.

In the rolling motion, the laundry is washed by friction with the wash water, friction between the laundry, and friction with the inner circumferential surface of the drum 32. In this case, the motion causes an adequate turning upside down of the laundry, thereby providing an effect of softly rubbing the laundry.

In the tumbling motion, the laundry is washed by friction of the laundry with the wash water and an impact caused by falling of the laundry, and especially by a mechanical force stronger than the mechanical force occurring in the rolling motion. In particular, the tumbling motion has an effect of disentangling and distributing the laundry.

In the rinsing step, laundry may be rinsed using the tumbling motion. In this case, new water may be supplied from an external water source to rinse the laundry. In addition, in order to rinse the laundry efficiently, water may be sprayed in a 5-way star shape not just using a spray motion with the four circulation nozzles 62b, 62c, 62d, and 62e, but also using direct spray with the direct water nozzle 62a.

The case of performing a 5-way star spray motion as water is sprayed through the direct water nozzle 62a connected to the spray valve 75 may correspond to the laundry soaking step and the rinsing step. However, the 5-way star spray motion is not limited to the laundry soaking step and the rinsing step, and may be performed in any of various cases according to an embodiment.

When the 5-way star spray motion is performed, the four circulation nozzles 62b, 62c, 62d, and 62e sprays water by way of the pump motor 73 and the direct water nozzle 62a sprays water by way of the spray valve 75. Since the circulation nozzles 62b, 62c, 62d, and 62e and the direct water nozzle 62a are controlled by different entities, it is necessary to control the 5-way star spray motion in an integrated manner. Hereinafter, synchronization of the circulation nozzles 62*b*, 62*c*, 62*d*, and 62*e* and the direct water nozzle 62*a* will be described.

A method for controlling a washing machine according to an embodiment of the present invention includes a step of supplying water into the tub 31, a step of rotating the drum 32, a step of accelerating rotation of the pump 36 while the drum 32 is rotating, and a step of, when a rotation speed of the pump 36 in acceleration reaches a preset value, opening the spray valve 75 to spray water supplied from an external water source toward the inside of the drum 32 through the direct water nozzle 62*a*. These steps may be implemented after the aforementioned detergent dissolving step.

Figure 7:
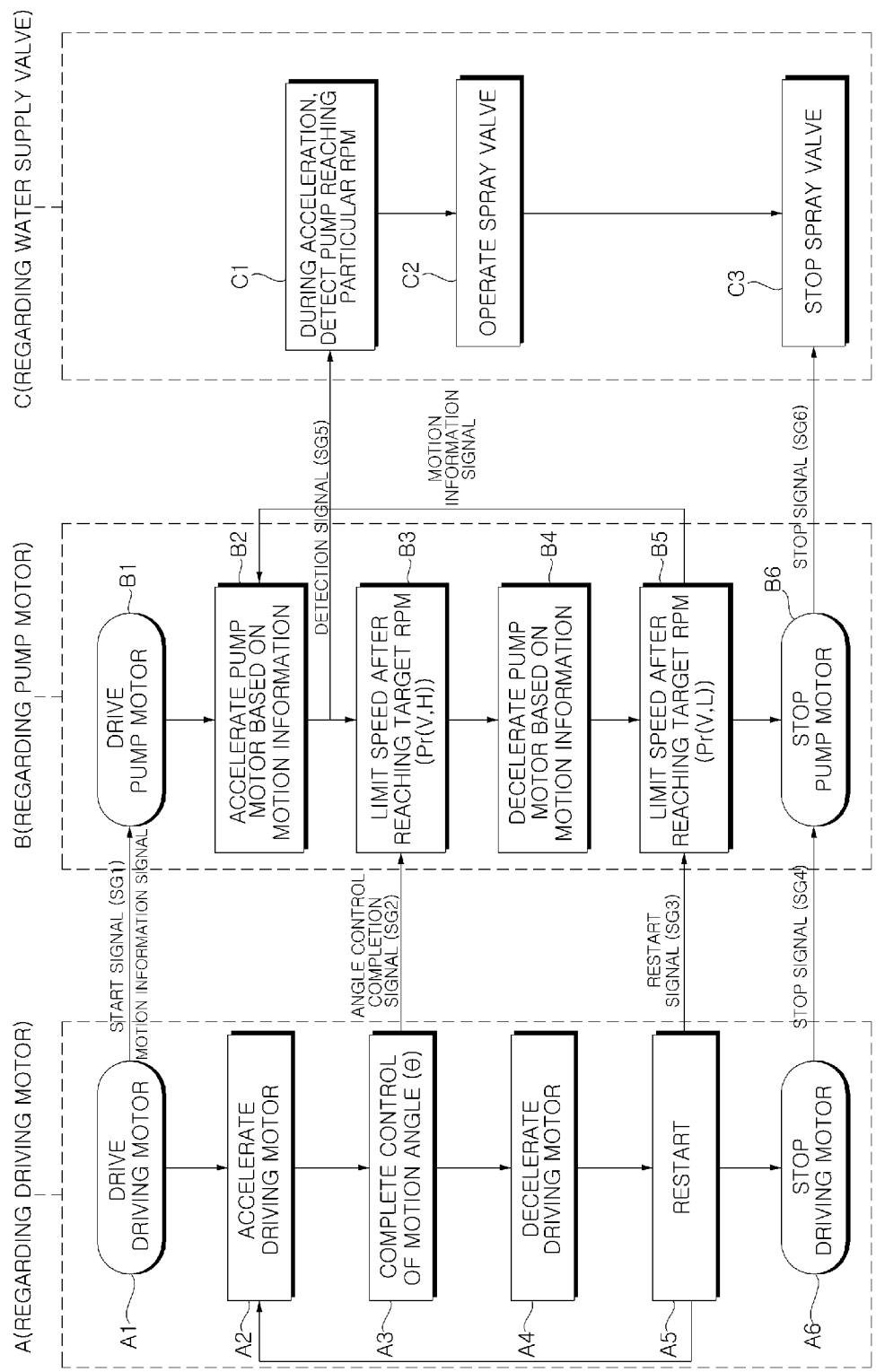
FIG. 7 is a flowchart illustrating a method for controlling a washing motor, the pump motor, and the spray valve in association with one another.
Figure 8:
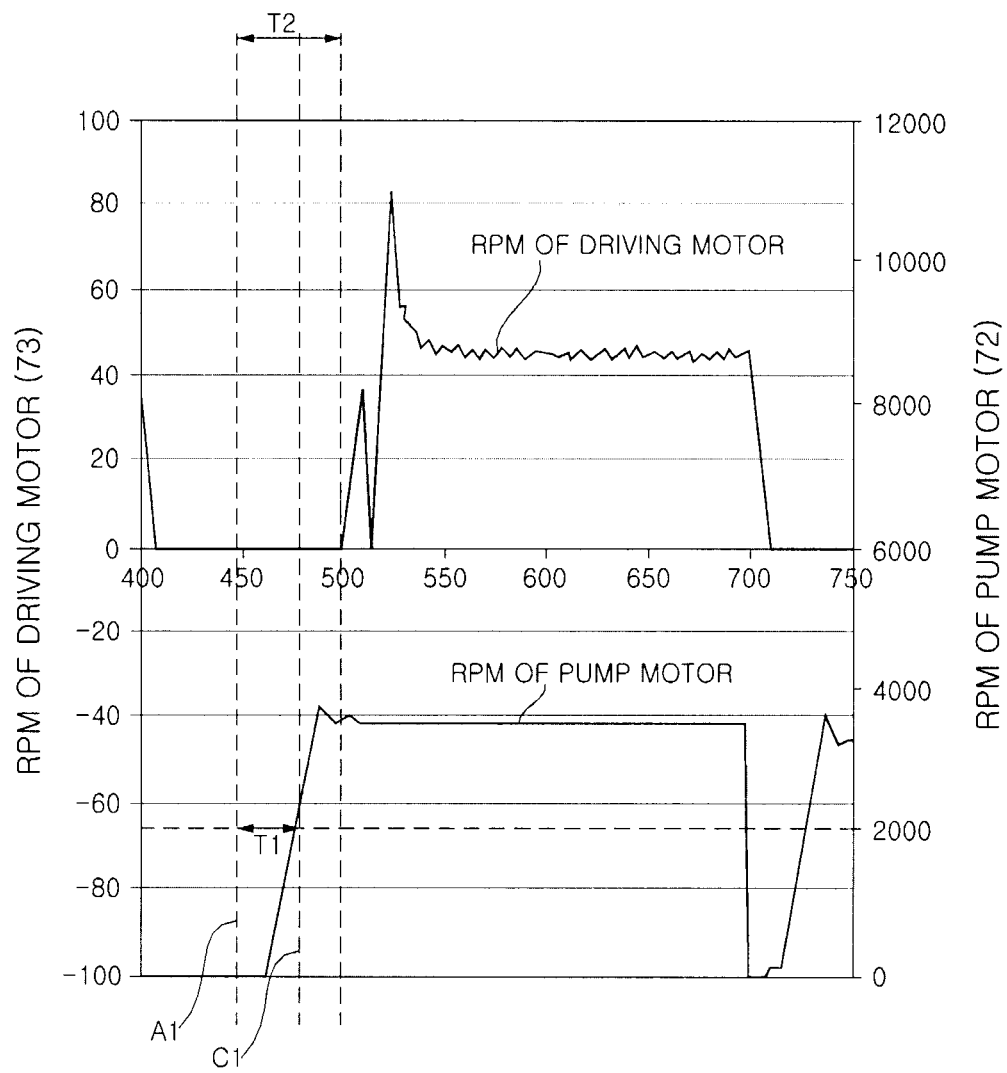
FIG. 8 is a diagram illustrating a time to drive the spray valve, and driving RPMs of the driving motor and the pump motor in relation to driving of the spray valve.

FIG. 7 is a flowchart illustrating a method for controlling a washing motor, the pump motor 73, and the spray valve 75 in association with one another. FIG. 8 is a diagram illustrating a time to drive the spray valve 75, and driving RPMs of the driving motor 72 and the pump motor 73 in relation to driving of the spray valve 75.

Hereinafter, a method for controlling synchronization of the direct water nozzle 62*a* connected to the spray valve 75 and the circulation nozzles 62*b*, 62*c*, 62*d*, and 62*e* connected to the pump motor 73 will be described.

In each driving motion shown I FIG. 8, the driving motor 72, the pump motor 73, and the spray valve 75 are in association with each other. Hereinafter, the way of controlling the driving motor 72, the pump motor 73, and the spray valve 75 will be described with reference to FIG. 7.

In FIG. 7, A1 to A6 indicate steps of controlling the washing motor, B1 to B6 indicate steps of controlling the pump motor 73, and C1 to C3 indicate steps of controlling the spray valve 75.

If a preset drum driving motion is performed while the washing machine is in operation, the processor 71 controls the driving motor 72, the pump motor 73, and the spray valve 75 by a method set for each driving motion. Specifically, the processor 71 initiates driving of the driving motor 72 (A1), and accelerates the driving motor 72 (A2). Rotation of the drum 32 may be accelerated by the driving motor 72, and the pump 36 may be accelerated in response to the acceleration of the rotation of the drum 32 (b2). The acceleration of the rotation of the pump 36 may be implemented based on preset motion information.

Then, the rotation of the drum 32 is decelerated (A4), and the rotation of the pump 36 may be decelerated in response to the decelerated rotation of the drum 32 (B4). There may be provided a sensor for sensing a rotation angle of the drum 32, and a rotation angle of the drum 32 sensed by the sensor reaches a value e set for each drum driving motion (hereinafter, referred to as a "motion angle") (A3), the processor 71 may control the driving motor 72 to be decelerated (A4). The decelerated rotation of the pump 36 (B4) may be implemented when a rotation angle of the drum 32 reaches a motion angle θ set for a corresponding drum motion (A3) and when a rotation speed of the pump 36 reaches a preset rotation speed upper limit value Pr(V, H) set for the corresponding drum motion.

When the pump 36 is decelerated and the rotation speed reaches a lower limit value Pr(V, L) set for the corresponding drum motion, the processor 71 may accelerate the pump 36 again (B5, B2).

As such, accelerating the pump 36 to the upper limit value Pr(V, H) in response to acceleration of the drum 32 and decelerating the pump 36 to the lower limit value Pr(V, L) in response to deceleration of the drum 32 may be performed multiple number of times (A2 to A5, B2 to B5).

A step of sensing an amount of laundry loaded in the drum 32 (laundry load) may be further performed. The upper limit value Pr(V, H) and the lower limit value Pr(V, L) may be set based on the sensed laundry load.

In the case of a rolling motion, a tumbling motion, and a filtration motion, one or more rotations of the drum 32 is performed and thus the motion angle θ has a value of 360 degrees or more.

On the contrary, in the case of a falling trigger motion by braking, such as a swing motion, a step motion, a scrub motion, etc., the motion angle θ is set to an appropriate value of 180 degrees or less according to characteristics of a corresponding drum driving motion.

As the drum 32 is decelerated and stops, one time of a drum driving motion is completed and the drum driving motion is performed again (A5). The processor 71 repeats the steps A2 to A5 until the drum driving motion is performed a preset number of times, and, if the drum driving motion is performed the preset number of times, the processor 71 stops operating the driving motor 72 (A6).

Meanwhile, when the driving of the driving motor 72 is initiated, the processor 71 applies a start signal SG1 to the pump motor 73 and driving of the pump motor 73 is initiated in response to the start signal SG1 (B1). Then, based on motion information (that is, information on a drum driving motion being currently performed), the processor 71 accelerates the pump motor 73 according to a setting predetermined for the drum driving motion (B2).

If an existing AC motor is used, the speed of the pump motor 73 cannot be varied. In this case, although a drum driving motion changes, the pump motor 73 has to rotate at a constant speed. However, the present invention uses a BLDC pump motor and thus is able to appropriately control a rotation speed of the pump motor 73 and furthermore control the rotation speed based on a laundry load.

More specifically, in the case of a falling trigger motion by braking, such as a swing motion, a step motion, and a scrub motion, the rotation speed of the pump motor 73 may be varied within a preset range according to a laundry load. In the case of a rolling motion, a tumbling motion, and a filtration motion, the rotation speed of the pump motor 73 may be set based on a laundry load in a period in which the rotation speed is maintained at a constant level.

Meanwhile, in the step A3, if the rotation angle of the drum 32 reaches a motion angle θ, the processor 71 applies an angle control completion signal SG2 to the pump motor 73. In the case of a falling trigger motion by braking, in the step B2, a rotation speed of the pump motor 73 is accelerated to an upper limit value Pr(V, H) set for a corresponding drum driving motion in response to the angle control completion signal SG2. After the rotation speed of the pump motor 72 reaches the upper limit value Pr(V, H), the pump motor 73 stops being accelerated (or the pump motor 73 is braked) and is then decelerated according to a setting set for the corresponding drum driving motion (B4, B5).

Then, in the step A5, when driving of the driving motor 72 is initiated again, the processor 71 applies a restart signal SG3 to the pump motor 73. IF the rotation speed thereof reaches to a lower limit value set for the corresponding drum driving motion, the pump motor 73 stops being decelerated (B5) in response to the restart signal SG3 and repeats the steps B2 to B5. In this case, if the drum driving motion changes, the pump motor 73 is accelerated again based on motion information on a changed drum driving motion according to a setting set for the changed drum driving motion.

Meanwhile, in the case of a swing motion, a tumbling motion, or a filtration motion, at a time when the angle control completion signal SG2 is applied to the pump motor 73, the pump motor 73 is rotating with maintaining a rotation speed set for a corresponding drum driving motion. Thus, in the aforementioned motions, the pump motor 73 is decelerated (B4) in response to the angle control completion signal SG2.

Meanwhile, in any drum driving motion, if the driving motor 72 stops in the step A6, the processor 71 applies a stop signal SG4 to the pump motor 72 and the pump motor 73 stops in response to the stop signal SG4 (B6).

In the case where the pump motor 72 is accelerated based on motion information according to a setting set for the corresponding drum driving motion, if the rotation speed of the pump motor 72 reaches a preset value, the processor 71 applies a detection signal SG5 to the pump motor 73 and the spray valve 75 detects that the pump motor 73 has reaches a predetermined PRM. If the spray valve 75 detects the signal from the pump motor 73, the spray valve 75 is driven to operate (C2).

Meanwhile, if a stop signal SG4 is applied to the pump motor 73, the processor 71 applies a stop signal SG6 to the spray valve 75 and the spray valve 75 stops in response to the stop signal SG6 such that water is no longer supplied.

The spray valve 75 detects the signal after a time T1 has passed since the initiation of driving of the driving motor 72. The signal is applied while the pump motor 73 is accelerated at a predetermined speed. The driving motor 72 still remains in an initial adjustment stage and is accelerated after a time T2 has passed, thereby increasing an rpm.

According to an embodiment of the present invention, when a 2000 or more rpm of the pump motor 73 is detected, a detection signal is applied to drive the spray valve 75. That is, when a rotation speed of the pump motor 73 reaches 200 rpm while the pump motor 73 is accelerated, the processor 71 may control the spray valve 75 to be opened such that water is sprayed through the circulation nozzles 62b, 62c, 62d, and 62e and the direct water nozzle 62a at the same time.

It may take 1.5 seconds for the spray valve 75 to operate in response to detection of a signal since initiation of the driving of the driving motor 72. In the initial adjustment stage, if a time period about two seconds has passed since driving of the driving motor 2, an rpm of the driving motor 72 may increase, accelerating the driving motor 72.

As such, in the case where the rpm is 2000 or more, a signal is applied to the spray valve 75, water spray by the pump motor 73 and water spray by the spray valve 75 may occur at the same time.

In this manner, a time to spray water through circulation nozzles and a time to spray water through a direct water nozzle may be synchronized. Since water is allowed to be sprayed through the circulation nozzles and the direct water nozzle at the same time, it is possible to perform a laundry soaking process and a rinsing process more efficiently and help a user to visually figure out the laundry soaking process and the rinsing process.

In addition, it is possible to more delicately control a spray motion using the spray valve 75 and the pump motor 73.

A time to stop spraying water through the circulation nozzles 62b, 62c, 62d, and 62e and a time to stop spraying water through the direct water nozzle 62a may be synchronized. Specifically, the processor 71 may close the spray valve 75 in response to stopping of the pump 36, thereby stopping water from being sprayed through the direct water nozzle 62a.

Meanwhile, while the pump 36 is accelerated (B2, B3), an area where water streams sprayed through the circulation nozzles 62b, 62c, 62d, 62e touch in the drum 32 changes in a depth direction of the drum 32. On the contrary, while the pump 36 is decelerated (B4, B5), an area which the water streams reach changes toward the entrance of the drum 32. Therefore, if acceleration (B2, B3) and deceleration (B4, B5) of the pump 36 are repeated, water streams sprayed through the plurality of circulation nozzles 62b, 62c, 62d, and 62e reciprocate back and forth within the drum 32.

Here, stopping of the pump 36 may be performed in response to stopping of rotation of the drum 32. In response to the stop signal SG$ corresponding to the stopping of the rotation of the drum 32, stopping of the pump 36 and closing of the spray valve 75 may be performed sequentially.

Meanwhile, according to an embodiment, while circulating water is sprayed through the circulation nozzles 62b, 62c, 62d, and 62e, drainage may be performed. For example, if a drain pump is provided separately from the pump 36, the drain pump may operate while the pump 36 operates. In another example, if the drain pipe 19 is connected to the tub 31 rather than the pump 36 and there is a drain valve for regulating the drain pipe 19, the drain valve may be opened while the pump 36 operates.

In the case where the pump 36 operates during draining of water, the level of water in the tub 31 descends due to the draining, so water circulation by the pump 36 is not allowed as long as a water supply is performed. Thus, although water is being drained, the spray valve 75 may be opened to allow water to being continuously sprayed through the circulation nozzles 62b, 62c, 62d, and 62e. Although water is being drained, water may be sprayed through the circulation nozzles 62b, 62c, 62d, and 62e and the direct water nozzle 62a at the same time.

As such, during draining of water, operating the pump 36 and allowing water to be sprayed through the direct water nozzle 62a may be implemented in any one of the detergent dissolving step ("detergent dissolving"), the laundry soaking step ("laundry soaking"), the washing step ("washing"), and the rinsing step ("rinsing").

What is claimed is:

1. A method of controlling a washing machine comprising a tub with an entry hole configured to receive laundry, a drum rotatably disposed in the tub, a ring-shaped gasket disposed along a circumference of the entry hole of the tub, a pump configured to circulate water that is discharged from the tub, at least one circulation nozzle provided in the gasket and configured to spray the water that is circulated by the pump into the drum, and a processor configured to receive an output value of the pump and control rotation of the pump, the method comprising:
   supplying water into the tub;
   rotating the drum;
   accelerating a pump speed of the pump while the drum rotates; and
   based on the pump speed of the pump reaching a threshold speed during the acceleration of the pump, opening a spray valve of the washing machine such that water supplied from an external water source is sprayed into the drum through a direct water nozzle.

2. The method of claim 1, wherein supplying the water into the tub comprises:
   supplying the water into the tub through a dispenser with detergent contained therein.

3. The method of claim 1, further comprising draining water from the tub during operation of the pump,
   wherein opening the spray valve comprises:
      while draining water from the tub, opening the spray valve to supply water from the external water source to the tub and circulate, through the at least one circulation nozzle, water received in the tub from the external water source.

4. The method of claim 1, further comprising:
stopping the pump; and
terminating the spraying of the water through the direct water nozzle by closing the spray valve based on stopping the pump.

5. The method of claim 4, wherein stopping the pump corresponds to stopping the rotation of the drum.

6. The method of claim 5, wherein stopping the pump and closing the spray valve are performed sequentially based on a stop signal that corresponds to stopping the rotation of the drum.

7. The method of claim 1, wherein rotating the drum comprises:
accelerating the rotation of the drum; and
subsequent to accelerating the rotation of the drum, decelerating the rotation of the drum,
wherein the method further comprises:
accelerating the pump speed of the pump based on the acceleration of the rotation of the drum, and
decelerating the pump speed of the pump based on the deceleration of the rotation of the drum.

8. The method of claim 7, wherein the deceleration of the pump speed of the pump is performed based on (i) a rotation angle of the drum reaching a threshold angle that is set for a preset drum motion, and (ii) a pump speed of the pump reaching a threshold upper limit pump speed value that is set for the preset drum motion.

9. The method of claim 8, further comprising reaccelerating the pump based on (i) the pump being decelerated during rotation of the drum, and (ii) the pump speed of the pump reaching a lower limit pump speed value that is set for the preset drum motion.

10. The method of claim 8, further comprising sensing a laundry load in the drum,
wherein accelerating the pump to the upper limit pump speed value and decelerating the pump to the lower limit pump speed value are repeated, and
wherein the upper limit pump speed value and the lower limit pump speed value are set according to the laundry load that is sensed in the drum.

11. The method of claim 1,
wherein rotating the drum is controlled by at least one processor based on information regarding a preset drum motion, and
wherein the acceleration of the pump speed of the pump is performed based on the information on the preset drum motion.

12. The method of claim 11, further comprising decelerating the rotation of the drum based on a rotation angle of the drum reaching a threshold angle that is set for the preset drum motion.

13. The method of claim 1,
wherein the at least one circulation nozzle comprises a plurality of circulation nozzles,
wherein the direct water nozzle is disposed at a height that is higher than the plurality of circulation nozzles, and
wherein the plurality of circulation nozzles is disposed such that two or more of the plurality of circulation nozzles are provided on a left side and a right side of the gasket, respectively, with reference to the direct water nozzle.

14. The method of claim 13, wherein a pair of circulation nozzles on the left side of the gasket and a pair of circulation nozzles on the right side of the gasket are arranged symmetric to each other.

15. The method of claim 14,
wherein the pair of circulation nozzles on the left side of the gasket is arranged at different heights, and
wherein the pair of circulation nozzles on the right side of the gasket is arranged at different heights.

16. The method of claim 15,
wherein a lower nozzle among the pair of circulation nozzles on the left side of the gasket has an upward-right spray direction, and an upper nozzle among the pair of circulation nozzles on the left side of the gasket has a downward-right spray direction, and
wherein a lower nozzle among the pair of circulation nozzles on the right side of the gasket has an upward-left spray direction, and an upper nozzle among the pair of circulation nozzles on the right side of the gasket has a downward-left spray direction.

17. The method of claim 16, further comprising decelerating the pump subsequent to the acceleration of the pump,
wherein the acceleration and the deceleration of the pump are repeated such that water streams that are sprayed through the pair of circulation nozzles on the left side of the gasket and water streams that are sprayed through the pair of circulation nozzles on the right side of the gasket reciprocate back and forth within the drum.

18. The method of claim 16, wherein, in a state in which water streams are simultaneously sprayed through the plurality of circulation nozzles and the direct water nozzle, the water streams are sprayed in a star shape.

19. A washing machine comprising:
a tub having an entry hole configured to receive laundry;
a drum rotatably disposed in the tub;
a driver configured to control a rotation of the drum;
a pump configured to circulate water that is discharged from the tub;
a gasket disposed along a circumference of the entry hole of the tub and comprising at least one circulation nozzle configured to spray the water that is circulated by the pump into the drum;
a water supply valve configured to regulate the water that is supplied into the tub;
a direct water nozzle configured to spray water from an external water source into the tub;
a spray valve configured to regulate the water from the external water source that is supplied to the direct water nozzle; and
a processor configured to:
receive an output value of the pump and control rotation of the pump;
open the water supply valve to supply water into the tub;
control the driver to rotate the drum based on a threshold amount of water being supplied into the tub;
accelerate pump speed of the pump while the drum rotates; and
based on the pump speed of the pump reaching a threshold pump speed value during the acceleration of the pump, open the spray valve.

20. The washing machine of claim 19, wherein the pump comprises a pump motor, and wherein the processor is configured to receive an output current of the pump motor, and to control rotation of the pump motor based on the output current.

\* \* \* \* \*